US006111852A

United States Patent [19]

Leung et al.

[11] Patent Number: 6,111,852
[45] Date of Patent: Aug. 29, 2000

[54] METHODS AND SYSTEMS FOR EMERGENCY ROUTING RESTORATION

[75] Inventors: William C. Leung; Weilin Wang; Roque M. Ip, all of Plano; Joyce A. Bradley, Rowlett; Syed Ayaz Ahmed; He Huang, both of Plano, all of Tex.

[73] Assignee: Nortel Networks Corporation, Montreal, Canada

[21] Appl. No.: 08/932,882

[22] Filed: Sep. 18, 1997

[51] Int. Cl.[7] ...................................................... H04L 1/22
[52] U.S. Cl. ............................................. 370/217; 714/13
[58] Field of Search .................................. 370/216, 217, 370/218, 219, 220, 221; 340/827, 825.16; 395/182.05, 182.09, 182.11, 182.14, 181, 182.01, 182.02; 379/220, 221, 9, 269; 714/12, 6, 13

[56] References Cited

U.S. PATENT DOCUMENTS 5,848,128   12/1998   Frey ............................................ 379/9

*Primary Examiner*—Douglas W. Olms
*Assistant Examiner*—Kenneth Van der puye
*Attorney, Agent, or Firm*—Carr & Storm, L. L. P.

[57] ABSTRACT

A method of accomplishing switchover from an inservice local to a remote NP (Network Processor) is described. The remote NP is periodically updated with configuration data obtained from the inservice local NP. Switchover from the local inservice NP to the remote NP is initiated. Communications between the remote NP and a plurality of NEs (Network Elements) is established nonsynchronously. The local NP is notified that the remote NP is established as an inservice NP.

6 Claims, 8 Drawing Sheets

FIG. 4

| Remote INSV | Remote ERS | Remote NOT found | 4 processes NOT offline | | Mode | Comment |
|---|---|---|---|---|---|---|
| Y | N | N | N | | ERS | |
| N | Y | N | N | | INSV | |
| – | – | Y | N | | ERS | |
| Y | N | N | Y | | ERS | mode conflict |
| N | Y | N | Y | | INSV | |
| – | – | Y | Y | | INSV | |

METHODS AND SYSTEMS FOR EMERGENCY ROUTING RESTORATION

BACKGROUND OF THE INVENTION

1. Field of the Invention

The present invention relates in general to communication systems and in particular to methods and systems for transferring operations from a local inservice routing recommendation set of NPs (Network Processors), which recommendation set is connected to a plurality of NEs (network element) switches, to a geographically remote emergency routing recommendation set of NPs and re-establishing operations with that same plurality of NEs.

2. Description of the Related Art

A long distance telephone system comprises a plurality of high capacity signal routing switches, commonly designated as NEs (network elements), situated throughout the country and interconnected by high speed transmission lines. A telephone call from New York city to Los Angeles may take any of many paths across country through any of a plurality of NEs: When an NE, or a set of lines interconnecting a pair of NEs, becomes overloaded with traffic, some incoming calls may be blocked resulting in a busy signal. A new attempt to place an identical call may use a different set of NEs with the result that the call gets to its desired destination.

The apparatus that may cause calls to be routed through different NEs at different times is appropriately designated, in the telephony communication art, "a Routing Controller". When such a routing controller operates to make routing recommendations in substantially real time in accordance with information received a fraction of a minute previously, the process is termed DCR (Dynamically Controlled Routing). For reliability, there is usually an active NP or CPU (Control Processor Unit) and a standby or backup NP or CPU at a control site. The backup NP is typically ready to takeover the functions of the active NP. This action is transparent to the users of the telephone customers having communications through the NEs.

A routing controller receives reports from each of the NEs to which it is connected, assimilates the information related to the percentage of fully loaded capacity of each of the NEs, the number of idle trunks between NEs etc. and transmits recommendations, to each of the connected NEs, as to which NEs should be used, where possible, for future calls that may overflow from that calls direct route. Each NE has internally a set of rules that is used by an individual NE for following or ignoring the received recommendations.

The system described above has operated for many years with a high level of operability. If however, a major disaster occurs which destroys the site of the routing controllers or if there is a major power failure in the area of the routing controllers, it becomes desirable to have a geographically remote set of routing controllers ready to take over the functions of supplying the NEs with routing recommendations upon short notice.

A prior art ERS (Emergency Restoration System) has been used where a geographically remote set of backup NPs can be put into service to form the functions of active and standby routing controllers. This system included a plurality of command terminals, designated as UPs (User Positions), connected to the local and remote set of NPs through the use of a communication network. The prior art system used a synchronous method of gathering information from associated NEs, required updating the NPs with the latest configuration information and further required rebooting before even attempting to communicate with each of the NEs in the system and the UPs. Even where everything operated under optimum conditions, a switchover from a local to a remote set of routing controllers required approximately 30 minutes. Over a time period of 30 minutes, the loading conditions of each of the NEs in a large network of routing controllers such as occurs in the USA can change drastically. Such changes may cause many telephone calls may be blocked due to less than optimal routing of calls when the NEs are not receiving routing recommendations from a routing controller on a dynamic basis.

More information on the basic functions of routing controllers may be obtained from a U.S. Pat. No. 4,282,852 issued Aug. 18, 1981 to Szybicki et al. and assigned to Northern Telecom Limited.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a table used to describe the mode to which a NP is set after it is first brought up;

SUMMARY OF THE INVENTION

According to one embodiment of the present invention, the process disclosed reduces the time required for a dynamic routing controller to restore its DCR (Dynamically Controlled Routing) services for a given number of network elements to within 5 minutes after a catastrophic failure is detected.

This routing controller system comprises a pair of geographically separate NPs (Network Processors), normally operating in an inservice and Backup mode, respectively. Should there be any catastrophic failure of the inservice NP, the Backup NP can be activated to take over the control and quickly restore DCR services.

The reduction in time is accomplished first by periodically updating the configuration data in the remote NPs whereby the remote NPs may commence priming or establishing communication with each of the affected NEs without having to first reboot the NPs as was done in the prior art. Second, the priming operation is non synchronous thereby allowing communication to be established with a large number of NEs in a batch type process without overloading the CPU of the NPs as occurred in the prior art synchronous process.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DESCRIPTION OF THE PREFERRED EMBODIMENTS

The principles of the present invention and their advantages are best understood by referring to the illustrated embodiment depicted in FIGS. 1–12, in which like reference numbers describe like parts.

Figure 1:
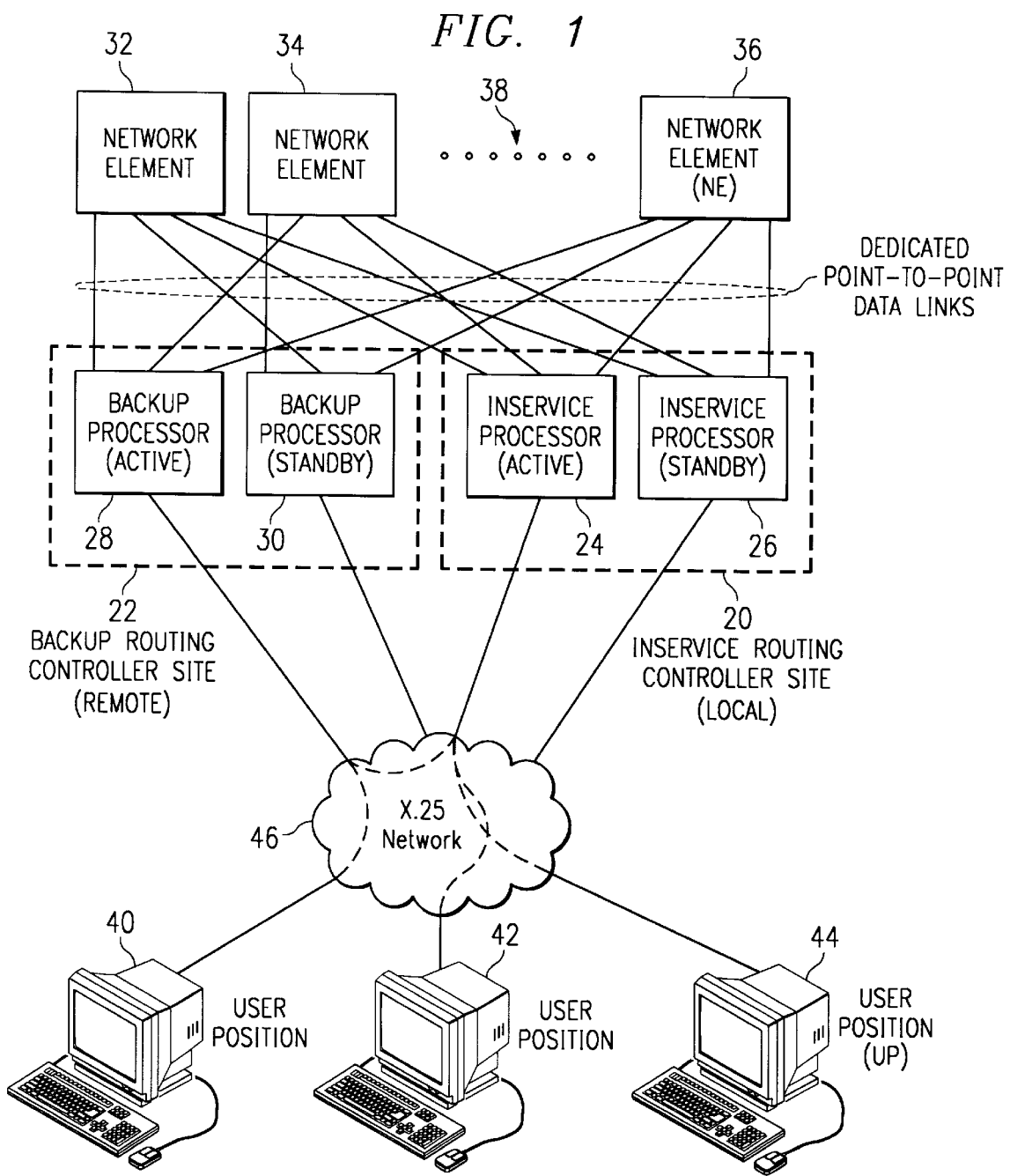
FIG. 1 is a block diagram of inservice (local) and backup (remote) routing controllers interconnected to NEs (network elements) and user terminals.

FIG. 1 is a block diagram showing the interconnection of two routing controller sites 20 and 22 each including a standby as well as an active network processor commonly referred to in the art as a NP. Controller site 20 is designated for the purpose of discussion of operation as the inservice or local site and comprises an active NP 24 and a standby NP 26. The other site 22, which for the purposes of the invention, is geographically remote and is variously labeled backup or ERS (emergency restoration system) in this description, comprises an active NP 28 and a standby NP 30. Each of the NPs 24–30 is connected to each of a plurality of NEs (network elements) 32, 34 and 36 as shown. The designator 38 represents a normal additional number of NEs. There is further shown in this FIGURE, a plurality of UPs (user positions) 40, 42 and 44 interconnected to each of the NPs by a network 46. In a preferred embodiment of the invention, the network 46 uses the X.25 protocol as a well accepted and tested standard for communications. The UPs are traditional terminals from which technicians or other users may monitor the performance of routing controllers 20/22, initiate transfers or switchovers of routing controllers 20/22, perform system configuration alterations, etc.

It will be realized by those skilled in the art, that a customer using the present system will typically perform a transfer of operations from an active to a standby processor on a periodic basis, and at a time of low traffic, to assure the customer that the components are ready to properly operate during an emergency. Operations will also be switched over from the active, local or inservice site to the backup, remote or ERS site on a periodic basis for the same reason. The term "transfer" will be used throughout this description to refer to an alteration of operations from an active to a standby processor while "switchover" will be used to refer to an alteration of operations from a local site to a remote site.

In operation, any information gathered by the active inservice NP 24 and any recommendations set out by NP 24 are also supplied to the standby NP 26 such that it is always ready to takeover the routing functions in accordance with procedures and software well established in the art. On a periodic basis, such as once an hour, all the appropriate files that may be subject to change are transferred to the backup site 22. Once the files are successfully transferred, the NP processors 28 and 30 at backup site 22 are updated with the latest data. Thus, if a switchover is initiated, the active processor, such as processor 28, need only establish communication with each of the NEs, such as NEs 32–36 before being able to resume the routing recommendation function previously performed by NP 24.

In a preferred embodiment of the invention, the establishment of communication between the newly designated inservice NP 28/30 and the NEs 32/38 occurred in batches of NEs. The communication establishment process is termed a "priming" function. Messages initiating contact are sent out to the first batch of NEs on an internal list and any received replies are placed in memory and acted upon in a "first in first out" priority basis. In one embodiment of the invention, a batch comprises 60 NEs. The establishment of communications, including a determination of a given periodic time for receiving data from a given NE, takes several message transmissions back and forth. System timeout response limits prevents the reliable communication with more than a given number of NEs 32–38 in a batch.

Figure 11:
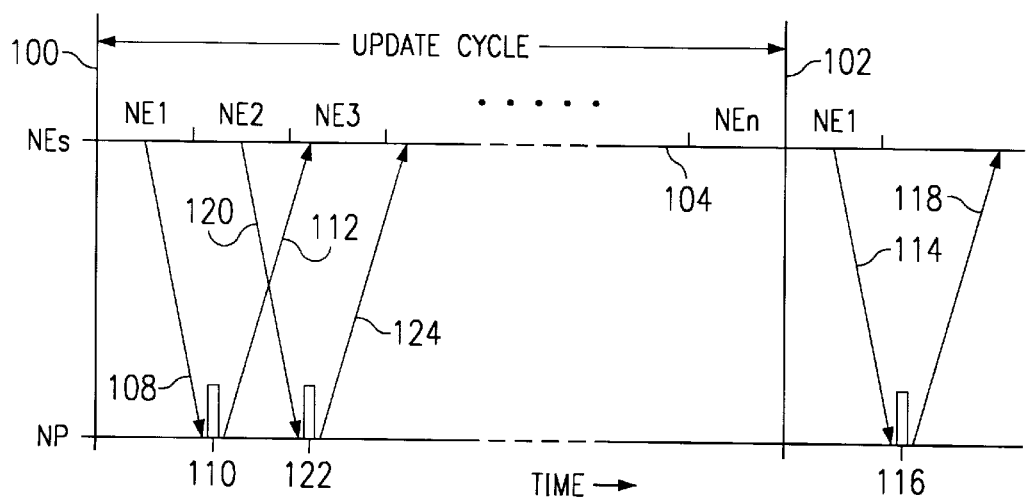
FIG. 11 illustrates a nonsynchronous data gathering technique used in communicating between the inservice NP and each of the NEs.

Each NE 32–38 is designed to supply a set of updated data on a periodic basis after that NE receives an enablement message. This periodic interval is termed an "update cycle" as shown in FIG. 11. The given NP, for example NPs 26–30, can thus evenly space the NE enablement messages throughout the update cycle. This is possible because the configuration information stored in the given NP includes information indicating the total number of NEs 32–38 being serviced and information allowing enablement messages to be directed to specific NEs by name or title. In this manner, each of the NEs 32–38 can communicate with the given NP 24–30 in its own unique time slot and the processing by the NP is evenly distributed throughout the update cycle. While some of the data used in updating the recommendations to a given NE may be close to 10 seconds old, an NP 24–30 can commence operations more quickly after a switchover is initiated since communications can be established with more NEs in a batch than occurred in the prior art. In other words the priming function is accomplished more efficiently. The nonsynchronous communication mode also allows an NP 24–28 to handle a larger number of NEs 32–38 in normal routing operation than it could using the synchronous process of the prior art After communication is established with a given batch-sized set of NEs, communications with the remaining batches of NEs 32–38 is attempted until a period of time is established for each batch of the NEs thereby allowing all NPs in the system to send data to the active inservice NP 24–28. At this time, normal dynamic routing operation is commenced with each NE switch reporting and being replied to at regular periodic intervals (referred to herein as an update cycle), such as 10 seconds, with all remaining NE switches reporting and being replied to during the time intermediate a given NEs reporting or update cycle.

An illustration of this process is provided by the drawing of FIG. 11. A reference time indicator 100 indicates when a first NE 32–38 is scheduled by the given NP 24–30 to report after the establishment of communications as presented above. This report communication is represented by arrow 108. The received data is processed by the corresponding NP during time indicated by 110 to update its view of the current status of the network. The NP during this time computes alternate routes for the first NE switch based upon all the most recently received data and returns this data in the form of a recommendation communication represented by arrow 112. During the next update cycle, at a time represented by indicator 102, the process is repeated for the same NE. The remaining NEs report and receive data during the time between 100 and 102. As an example, an arrow 120 represents a report from the second NE in the queue from reference time 100. The time shown as 122 is the processing time and the arrow 124 represents the reply to that second NE.

Figure 2:
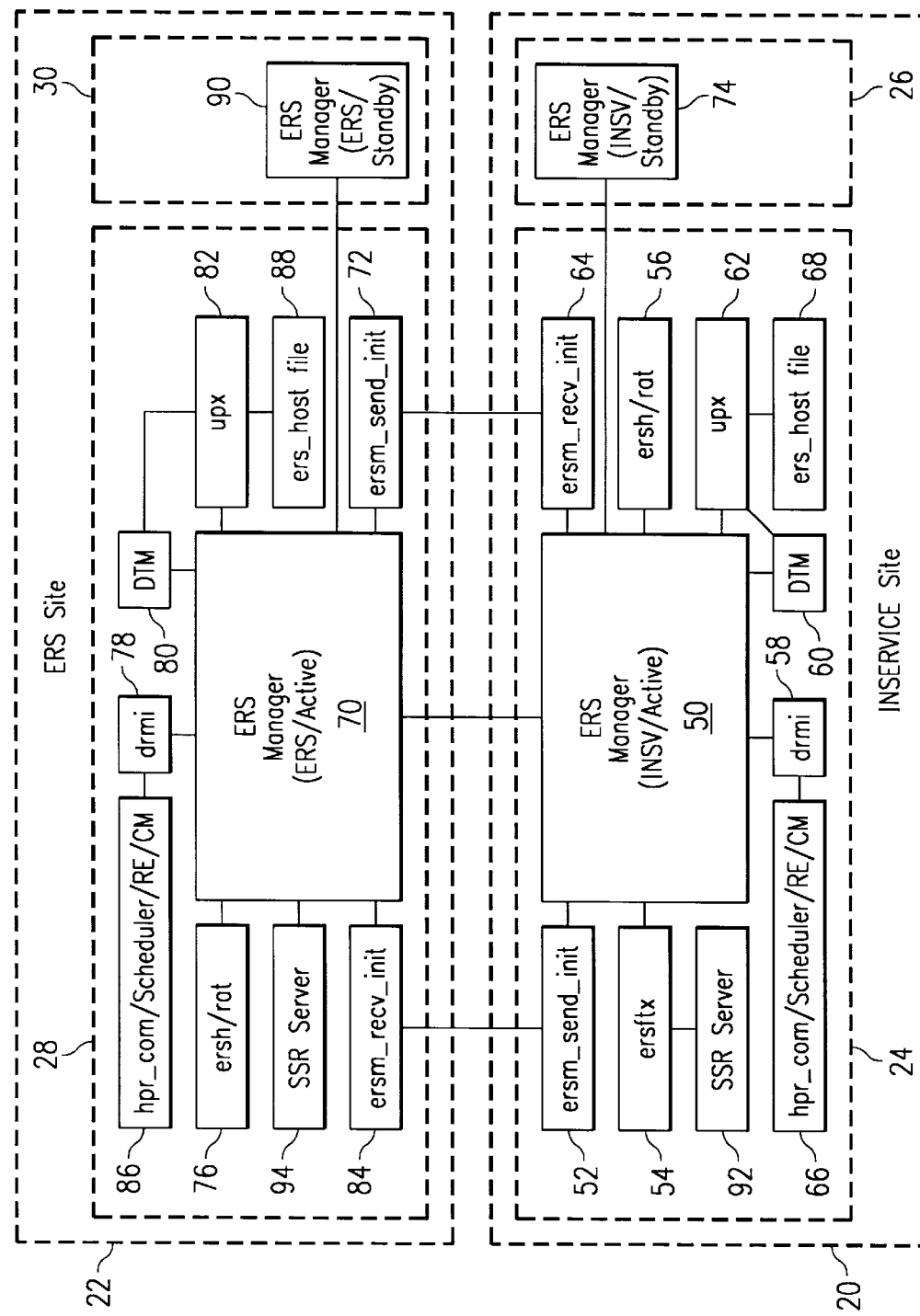
FIG. 2 shows the operating environment and feature interactions for inservice and backup routing controller units.

FIG. 2 uses the same designations for the NP units as used in FIG. 1. Various blocks within each of NPs 24 and 28 represent software functions that have been implemented to perform the routing function as well as the switchover and transfer functions and the reestablishment of communications after a change occurs as to which NP is the designated active inservice NP. As shown, NP 24 has a ERS Manager block 50 which is further labeled "INSV/Active" since it is the active unit at the inservice site. Block 50 is connected by lines to a "ersm_send_init" block 52, a "ersftx" block 54, a "ersh/rat" block 56, a "drmi" block 58, a "DTM" (Distributed Table Manager) block 60, a "upx" block 62 and a "ersm_recv_init" block 64. The connecting lines illustrate direct communication between the software processes being shown as blocks. Block 58 additionally communicates with a "hpr_com/Scheduler/RE/CM" block 66. Block 62 communicates with block 60 as well as a "ers_host file" block 68. Block 50, also referred to as the ERSM (Emergency Restoration System Manager) is connected to an active ERSM 70 in the remote site block 28 and a standby ERSM 74 in block 26. The functions corresponding to blocks 52–68 are not shown in the standby units 26 and 30 because these functions are inactive until that NP is activated.

The functions, other than previously unmentioned SSR server blocks 92 and 94, that are active when an NP is in the active ERS mode of block 28, are provided with a designator 20 digits higher than those used in block 24. It may be noted that only the "ersftx" is not utilized in an NP when it is in an ERS/Active mode. The ERSM block 70 is further connected to an ERSM block 90 in the standby block 30. The remaining items of this FIGURE are two functions designated as 92 and 94 and labeled SSR (System Save and Restore). SSR block 92 communicates with ERSM block 50 through the ersftx software of block 54 while SSR block 94 communicates directly with ERSM block 70 when that NP is in the ERS mode.

Figure 3:
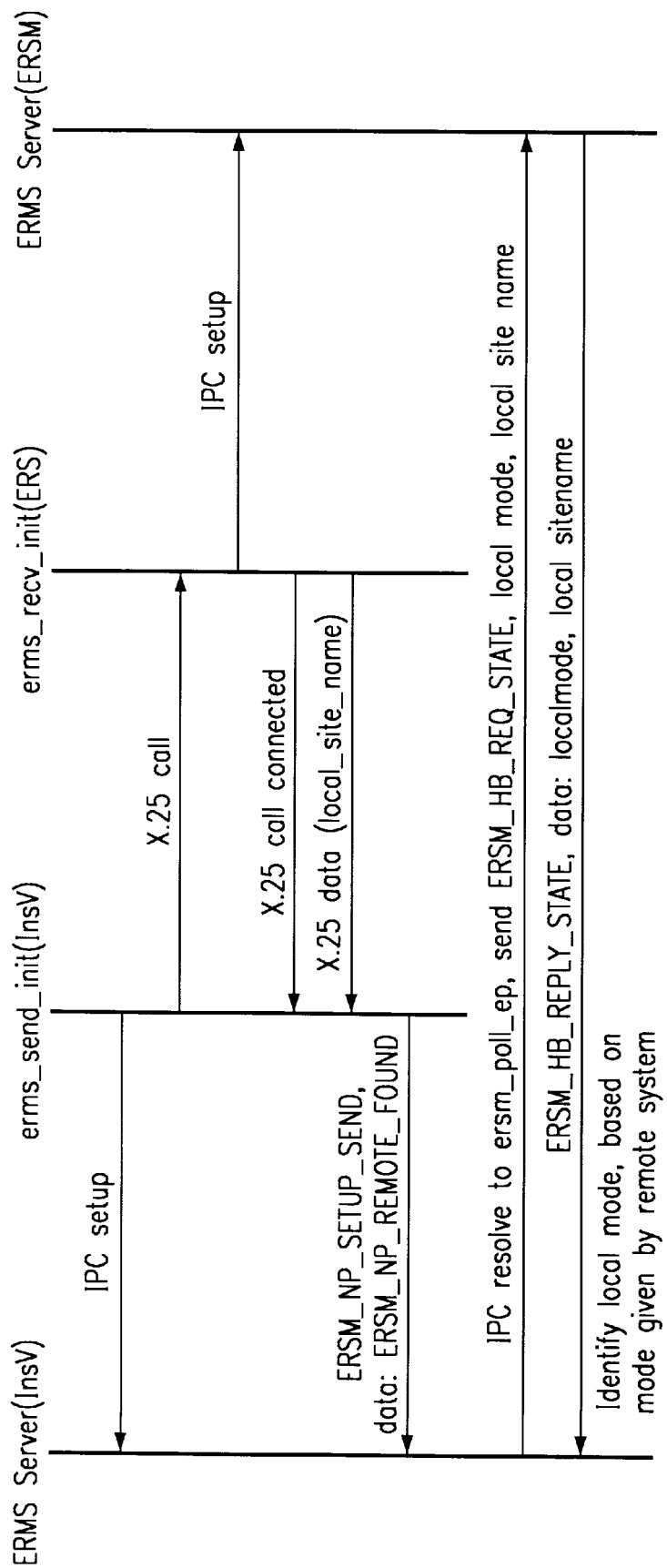
FIG. 3 is a dataflow diagram showing the process for establishing connection to the remote NP (network processor) when an emergency restoration system (ERS) is first brought up.
Figure 5:
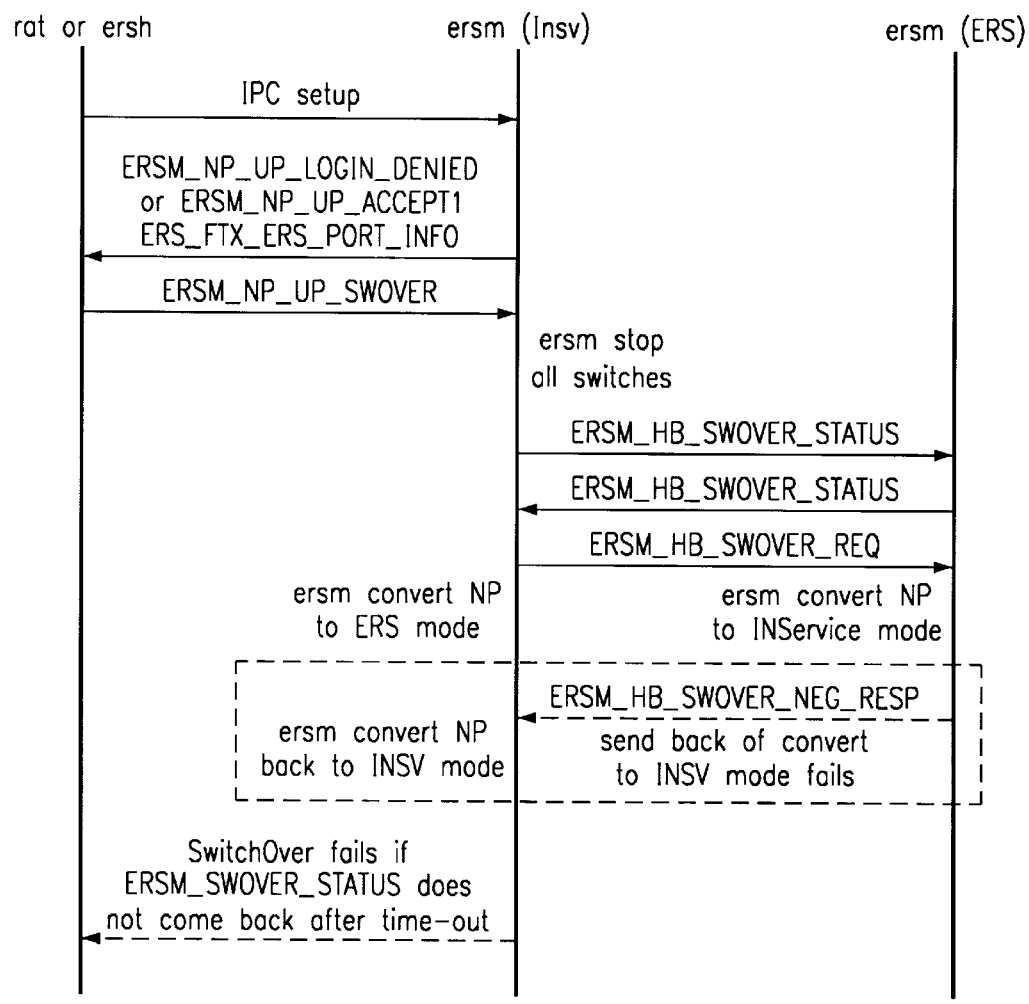
FIG. 5 is a dataflow diagram showing the data flow for an ERS switchover.
Figure 6:
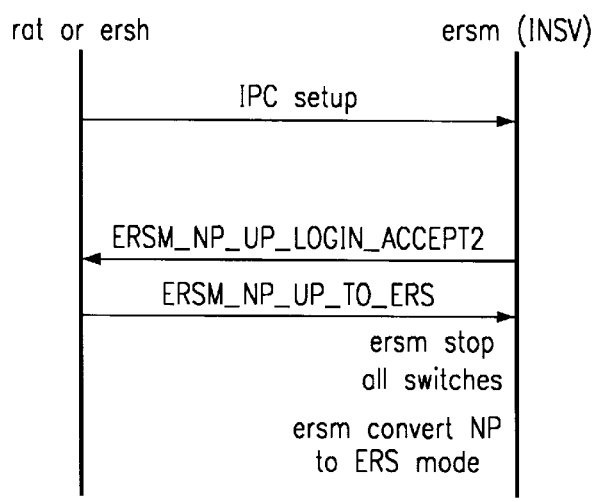
FIG. 6 is a dataflow diagram showing the data flow for a mode change of a routing controller from an inservice mode to an ERS mode.
Figure 7:
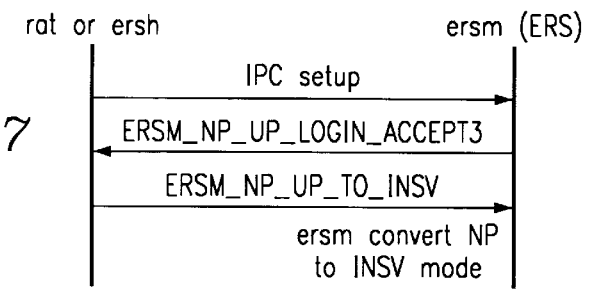
FIG. 7 is a dataflow diagram showing the data flow for a mode change of a routing controller from an ERS mode to an inservice mode.

The dataflow diagram of FIG. 3 illustrates the site connection setup process that is involved when an ERSM such as in block 24 is first brought up. When it is first brought up, its mode is set to "0" which indicates that it is in the ERS mode unless otherwise determined. It will send out a call from block 52 to block 84 as indicated through the network 46. A call connected message is first returned by block 84 and then data as to the site name. This data is returned to block 50 which will use the factors of the table of FIG. 4 to determine the mode of ERSM 24. As the first line or row of FIG. 4 indicates, if the received data indicates that remote unit 22 is INSV (in service) the mode of block 24 will be set to ERS. As another example, if there is no response from remote unit 22 after a predetermined number of tries, block 24 will consider the remote to be not found. This would indicate the situation of rows 3 or 6 of FIG. 4. If data is received that none of the 4 NP processes are occurring, as set forth in row 6, then block 52 must be INSV. Otherwise it would be left as ERS as indicated in row 3. The remaining situations will be apparent from the table.

A ERS switchover or mode change may be commenced in accordance with one of the dataflow diagram flows of communications as presented in FIGS. 5 to 8. Initially IPC (InterProcess Communication) setup occurs from the appropriate one of the processes "rat" (Remote Access Tool) or "ersh" (emergency restoration system human machine interface). After a connection is established with the inservice ERSM, the client will be told what kind of operation can be performed. (In the terminology of those involved in this art, a client is typically a program requesting a given function be performed and a server is a depository for the results of that function.) Examples, of operations to be performed, are a switchover from ERS NP to inservice NP as set forth in FIG. 5, ERS mode change from inservice to ERS mode as set forth in FIG. 6, ERS Mode change from ERS to inservice as set forth in FIG. 7, and a ERS mode change initiated from the ERS NP as set forth in FIG. 8. The client will then prompt the user to confirm the operation. After the operation is initiated, the client will exit.

Figure 8:
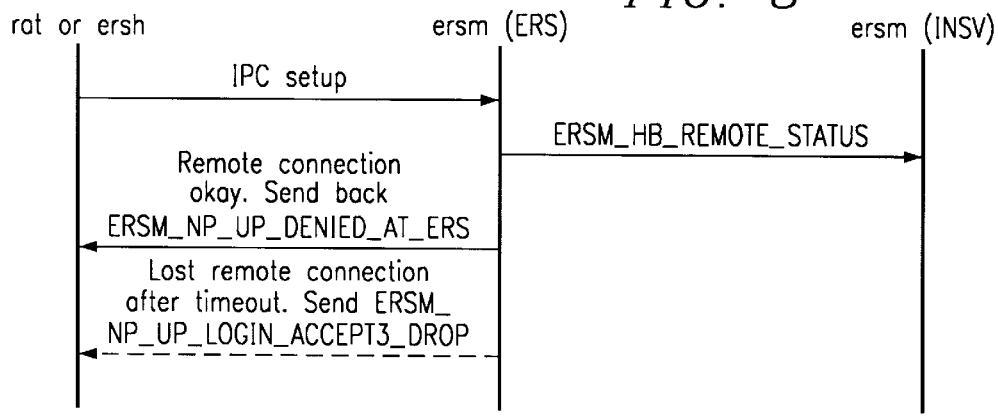
FIG. 8 is a dataflow diagram showing the data flow for an ERS mode change or a routing controller initiated by a user terminal connected to the ERS NP.
Figure 9:
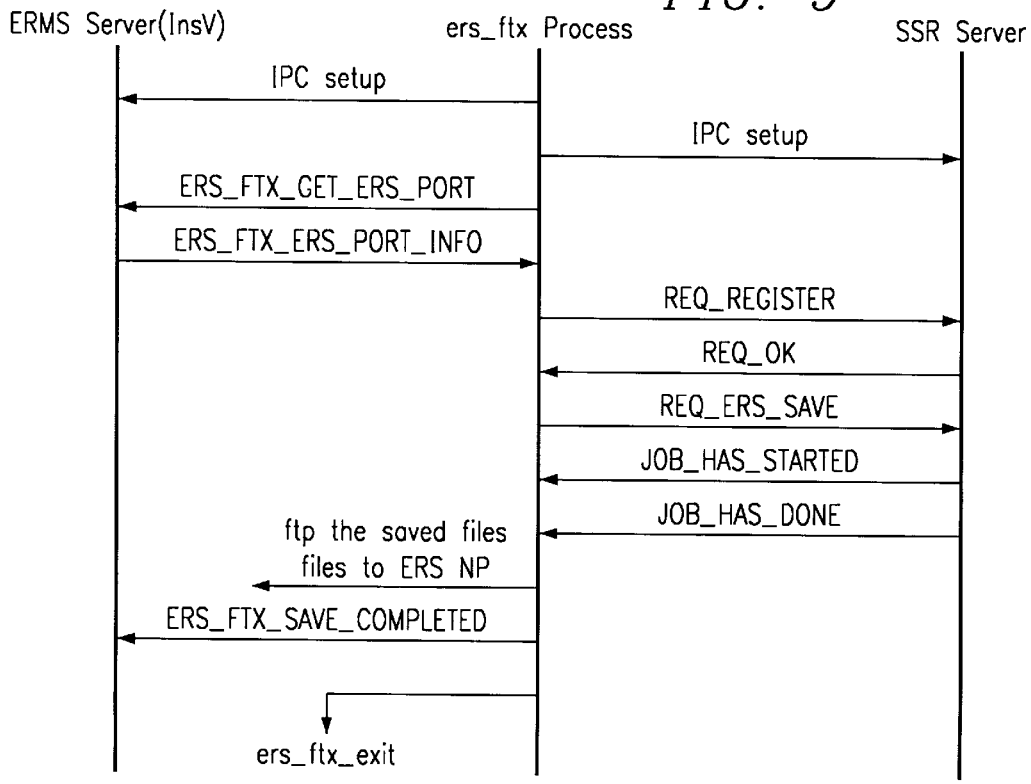
FIG. 9 is a dataflow diagram showing the data flow involved in the ERS file transfer process.

While the dataflow diagrams of FIGS. 5 to 8 are very straightforward, it may be appropriate to note that when the mode change is initiated from the ERS NP as set forth in FIG. 8, the ERSM 70 will test and check if the remote INSV NP is really inservice or not. If it is really INSV, the client is provided with the message that LOGIN is denied and a request is made to perform switchover from the INSV NP. If the remote INSV NP does not respond within a predetermined time, the ERS NP will declare the remote NP a lost connection and will drop all the client and server connections to the remote NP.

As mentioned previously, appropriate files are transferred from the INSV NP to the ERS NP on a periodic basis. The dataflow diagram of FIG. 9 sets forth the communications between the ersftx software block 54 and the ERSM block 50 in transferring the appropriate files to a single file for eventual transmission to the remote NP. The server block 92 informs block 54 when the job has started and when it is completed. Once the job is completed by SSR server 92, block 54 initiates transmission to a directory of the remote ERS NP. When the transmission is complete, block 54 exits this function.

Figure 10:
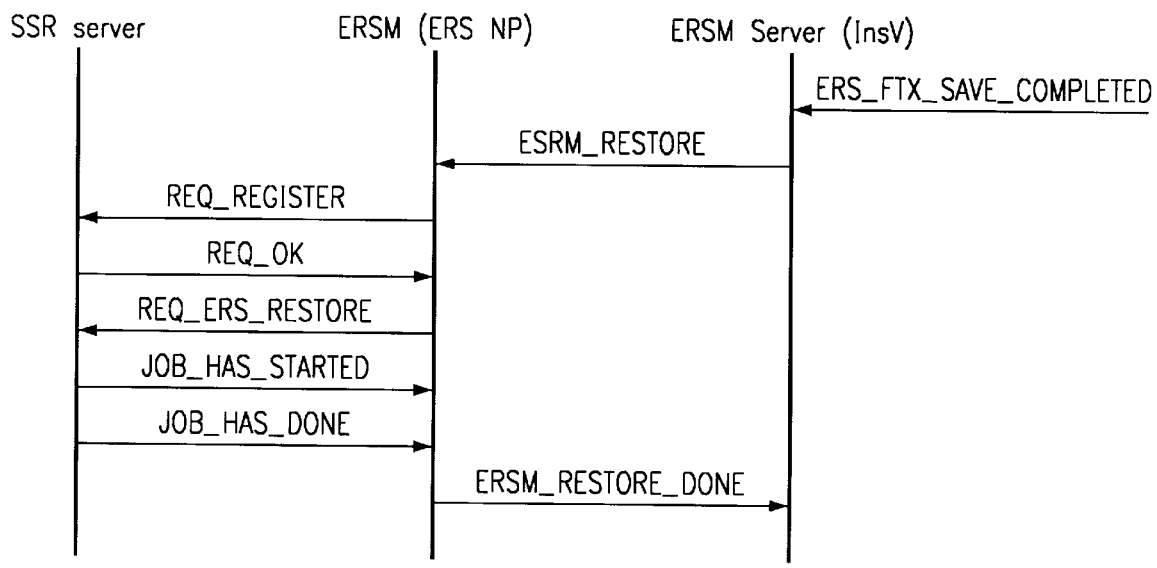
FIG. 10 is a dataflow diagram showing the data flow involved in the updating of the ERS files after the file transfer process of FIG. 9 is completed.

As shown in the dataflow diagram of FIG. 10, the reception of the save completed message by block 50 causes block 50 to communicate with block 70 of the ERS NP to restore or update the files in block 70 with the latest data. SSR Server block 94 accomplishes this function and when the job is complete, INSV ERSM block 50 is so informed via block 70.

Figure 12:
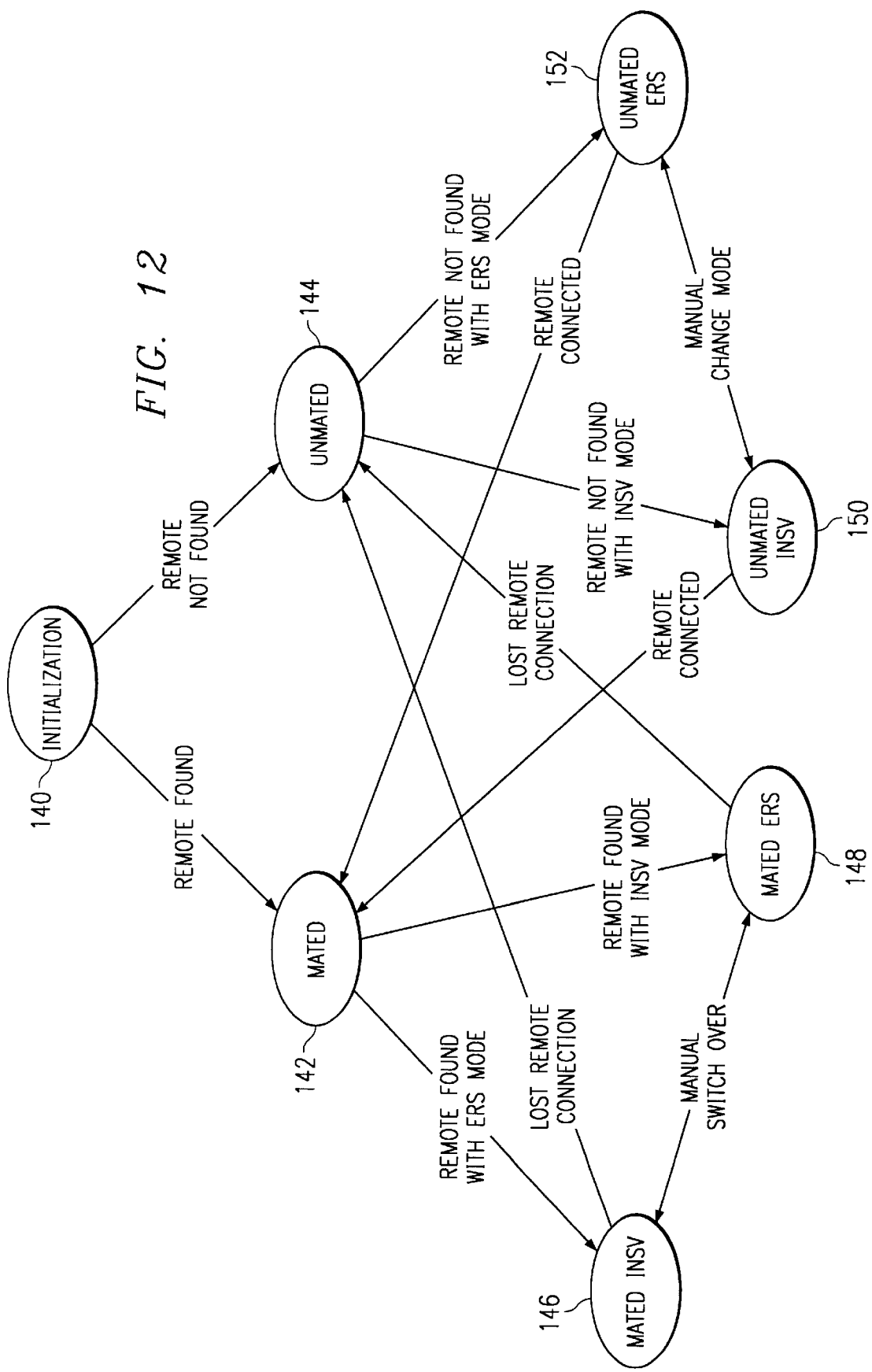
FIG. 12 comprises a state diagram illustrating how an NP resolves its state in accordance with the table of FIG. 4.

The state diagram of FIG. 12 illustrates an NP being initialized in bubble 140. The NP will attempt to contact the remote unit from stored data. If the remote is found, the state becomes mated as shown in bubble 142. If the remote is not found, the NP goes to state 144. Communication with a remote includes the passage of data indicating whether the remote NP is in the ERS or the INSV mode and the NP being initialized is accordingly set to the opposite state as shown by bubbles 146 and 148. As is also shown, the loss of the remote connection, once entering either of states 146 or 148 causes the NP to revert to the unmated state of 144. When a NP is in state 144, it will normally proceed to state 152 except for special circumstances such as a configuration change requiring the local NP to be reinitialized after it is already in service. In such an instance, the local NP will find that none of the four (4) critical processes as referenced in FIG. 4 column 4 are offline and thus as set forth in row 6 of FIG. 4, the NP needs to be set to an INSV (inservice) mode as shown by bubble 150. Whenever communication is again established with the remote when an NP is in either of states 150 or 152, the state that NP will revert to is 142 and from there to a more normal state of either 146 or 148.

For a complete description of a preferred design of a telecommunications system embodiment of the principles of the present invention, reference is now made to Appendix 1, which forms a part of this disclosure.

OPERATION

A brief review of the operation of the present invention will now be provided. Appendix 2, which forms a part of this disclosure, also describes these operational details.

When a NP (network processor) such as 28 is initialized or booted up it determines whether or not other NPs are up and running and the mode of operation the other NPs. The states that NP 28 would proceed through are shown in FIG. 12. The data flow involved in proceeding through these states is shown in FIG. 3 and the logic used in determining the next state after states 142 or 144 is set forth in the table of FIG. 4. Once the NP 28 is in one of the states 148 or 152, it can be manually changed in mode or status to an INSV (inservice) unit through the action of one of the UPs such as 40. The data flow for manual switchover from 148 to 146 is set forth in FIG. 5. The data flow for manual mode change from 152 to 150 is set forth in FIG. 7. If the involved NP was inservice at the time of switchover or mode change, the reverse action of state 146 to state 148 is accomplished in accordance with the data flow of FIG. 5 while a mode change from INSV to ERS (state 150 to 152) is set forth in FIG. 6.

As set forth previously, if an ERS mode change is initiated from a UP connected to that ERS NP, may be denied at shown in the data flow of FIG. 8 if the remote NP is really inservice at the time.

When the logical decisions have been made as to which site is inservice and which is backup and which NP at each site is active or standby, the active NP such as 24 can begin priming or initiating communication with each of the NEs (network elements).

Although priming has been successful in the prior art, it was accomplished in a synchronous format where, upon establishing contact with each NE, that NE was required to return data to the active NP at exactly the same time as all the previously contacted NEs. A NE is designed to return data at periodic intervals, designated as an update cycle, such as every 10 seconds after it receives an initial enablement signal. Thus, not only was the processing load on the NP increased as each NE was added, the time to establish contact with all the NEs was very long since each added NE required another 10 second interval to send the synchronizing enablement signal.

The priming as used herein sends out the initial contact signals in batches and as contact is established with each of the NEs in that batch, enablement signals are sent at substantially evenly spaced intervals over the update cycle such that, essentially, all the NEs in a batch could be enabled in a single update cycle. In practice it seldom takes more than a few update cycles to enable all the NEs in a given batch being primed. The evenly spaced replies over an update cycle are shown in FIG. 11.

Once the system is operational, as shown in FIG. 1, and the INSV block 24 is operating as a routing controller, it is important that operating data be periodically transferred to the remote ERS NP 28. The data flow for initiating this process is set forth in FIG. 9 and the updating process that occurs at NP 28 once the file transfer is complete is set forth in FIG. 10.

With periodic transfers of configuration and any other essential data, such as once an hour, the unit 28 is immediately able to commence the priming function after its status is changed from backup to inservice and the unit will shortly be operational such that telephone customers will be minimally inconvenienced with any blocked calls.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It is therefore, contemplated that the claims will cover any such modifications or embodiments that fall within the true scope of the invention.

What is claimed is:

1. A method of accomplishing switchover from an inservice local to a remote NP (network processor), comprising the steps of:

periodically updating said remote NP with configuration data obtained from said inservice local NP;

initiating switchover from said local inservice NP to the remote NP;

establishing communications between said remote NP and two or more batches of NEs (network elements) in spaced intervals, wherein at least one batch contains a plurality of NEs, said step of establishing communications between said remote NP and said plurality of NEs comprising the substeps of:

initiating contact with a selected batch of said NEs;

receiving replies from said selected batch of NEs; and determining a periodic time for receiving data from a selected NE; and notifying the local NP that the remote NP is established as an inservice NP.

2. The method of claim 1 further comprising the step of periodically transmitting updated data from a selected said NE to said remote NP during a time period determined for said selected NE.

3. A real-time routing controller and associated NE (network element) apparatus comprising, in combination:

a plurality of NEs;

local inservice NP (network processor) apparatus interconnected for communicating with each of said plurality of NEs, for receiving traffic data therefrom and for supplying routing recommendations thereto;

geographically remote ERS (Emergency Restoration System) NP apparatus interconnected for communicating with each of said plurality of NEs when said remote NP is in an inservice mode;

at least one UP (user position) terminal connected for communicating with either of said local inservice NP and said remote ERS NP;

means for maintaining up-to-date system configuration data at said local inservice NP;

means for periodically updating system configuration files comprising a part of said ERS NP;

means for initiating a switchover of operations from said local NP to said remote NP; and means within said remote NP for establishing communications in spaced intervals with each of a batch of said plurality of NEs as part of a priming function.

4. The real-time routing controller and associated NE apparatus of claim 3 wherein said means for establishing communications includes means for establishing a periodic time for receiving data from a selected NE.

5. The real-time routing controller and associated NE apparatus of claim 3 further comprising means within said remote NP for transmitting enablement messages to a selected NE by title.

6. The real-time routing controller and associated NE apparatus of claim 5 wherein said selected NE returns periodic data to said NP after receipt of a said enablement message.

* * * * *